3,564,038
ALKYL KETO-ALKYL SULFITES

Rupert A. Covey, Wolcott, and Bogislav von Schmeling and Charles E. Crittendon, Hamden, Conn., assignors to Uniroyal, Inc., New York, N.Y., a corporation of New Jersey
No Drawing. Filed Dec. 22, 1967, Ser. No. 692,714
Int. Cl. A01n 9/14; C07c 137/00
U.S. Cl. 260—456   5 Claims

ABSTRACT OF THE DISCLOSURE

Novel sulfite esters having the formula

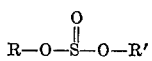

wherein R is on alkyl or a mono-haloalkyl radical having up to 10 carbon atoms and R' is a ketoalkyl group having 3 to 5 carbon atoms or a mono-halosubstituted derivative thereof, useful as herbicides, insecticides, and nematocides.

---

This invention relates to alkyl ketoalkyl sulfites as new compositions and their biological uses.

The compounds of the invention have the formula:

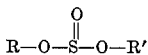

in which R is an alkyl or a mono-haloalkyl radical of up to 18 carbon atoms, preferably up to 10 carbon atoms, and R' is a ketoalkyl radical of 3 to 10 carbon atoms, preferably 3 to 5 carbon atoms, and their mono-halo-substituted derivatives.

Examples of R are methyl, ethyl, propyl, isopropyl, butyl, isobutyl, sec.-butyl, tert.-butyl, amyl, hexyl, 2-ethylhexyl, heptyl, octyl, nonyl, decyl, isodecyl, undecyl, dodecyl, hexadecyl, octadecyl, chlorooctyl and bromodecyl.

Examples of R' are 2-ketopropyl, 3-ketobutyl, 2-ketopentyl, 3-ketopentyl, 4-ketopentyl, 2-methyl-3-ketobutyl, 3-keto-2-butyl, 4-ketohexyl, 3-ketoheptyl, 7-ketooctyl, 3-ethyl-4-ketohexyl, 4-keto-3-decyl, 3-keto-4-chloropentyl, and 2-bromo-4-keto-hexyl.

The chemicals of the invention may be prepared by reacting a ketoalkanol with the chlorosulfinate of an alcohol; the latter may be made by reacting the alcohol with thionyl chloride. Such preparation is illustrated by the following reactions:

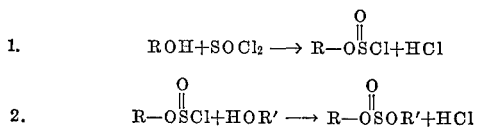

The first reaction is carried out at a temperature of between −5° C. and 30° C., preferably near 0° C., and the yield of chlorosulfinate is nearly quantitative. An inert solvent such as benzene, xylene or solvent naphtha may be used, but is generally unnecessary. The second reaction is carried out in the presence of an HCl acceptor, such as pyridine, dimethylaniline or trimethylamine, and in a solvent such as benzene, xylene, or solvent naphtha. The reaction temperature is generally between −10° C. and 50° C., preferably near 0° C.

The following is an example which illustrates the preparation of the compounds of the present invention:

EXAMPLE I

Preparation of 2-ketopropyl octyl sulfite

To 910 g. (7.0 moles) n-octyl alcohol cooled to 5–10° was added dropwise with stirring 635 ml. (1040 g., 8.75 moles) thionyl chloride, keeping a maximum reaction temperature of 25°. The mixture was allowed to stand 16 hours and then the dissolved HCl was removed with an aspirator. Further stripping of the chlorosulfinate was carried out at 25° (3 mm.) by means of a vacuum pump. The yield is nearly quantitative and the material is of sufficient quality to be reacted directly in the next step.

To a cooled solution of 10.6 g. (0.05 mole) n-octyl chlorosulfinate in 20 ml. benzene was added a solution of 3.7 g. (0.05 mole) hydroxyacetone and a 4.0 ml. (4.0 g., 0.05 mole) pyridine in 5 ml. benzene, keeping the reaction temperature below 10°. The mixture was stirred for a few minutes and then was washed with 25 ml. water, 25 ml. 2 N NaOH and twice with 25 ml. saturated salt solution. The organic layer was dried and the solvent was removed under reduced pressure. The product was distilled as a pale yellow oil B.P. 113–119° (0.5 mm.), yield 7.3 g. (58%).

*Analysis.*—Calc'd for $C_{11}H_{22}O_4S$ (percent): S, 12.81. Found (percent): S, 12.39.

Sulfur analyses and boiling points of other chemicals of the present invention are shown in Table I.

TABLE I

| | | Sulfur analysis | |
|---|---|---|---|
| | B.P.° C. | Calculated | Found |
| 2-ketopropyl hexyl sulfite | 109–112(1 mm.) | 14.42 | 14.39 |
| 2-ketopropyl decyl sulfite | 140–147(2 mm.) | 11.52 | 11.15 |
| 4-ketopentyl octyl sulfite | | 11.52 | 11.11 |
| 2-methyl-3-ketobutyl octyl sulfite | 138–141(1.7 mm.) | 11.52 | 11.48 |
| 3-keto-2-butyl octyl sulfite | 117–124(0.6 mm.) | 12.13 | 11.81 |

In accordance with this invention it has been discovered that alkyl ketoalkyl sulfides have outstanding chemical activity with regard to killing meristematic buds. They may be used for killing meristematic buds on ornamental and agricultural herbaceous, semi-woody and woody plants such as chrysanthemum, cotton, azalea, apple and tobacco. Meristematic buds include both terminal and axillary buds. The selective killing of terminal buds is an application for which the chemicals of the invention are particularly useful.

Additionally, the compounds of the invention are useful as insecticides and nematocides.

For the several biological uses, the compounds of the present invention may be applied to plants, which term includes various plant parts such as seeds, flowers, fruits, vegetables, roots and foliage in various manners. Seeds may be treated directly with the chemical before planting, or seeds may be treated with the chemical by incorporating the chemical in the soil before or after planting the seeds. The chemicals may be applied to plants in an inert medium as a dust in admixture with a powdered solid carrier, such as the various mineral silicates, e.g., mica, talc, pyrophyllite and clays or as an aqueous composition. The chemicals may be applied in admixture with small amounts of surface-active wetting agents, which may be anionic, non-ionic, or cationic surface-active agents, generally as aqueous compositions. The chemicals may be dissolved in organic solvents such as acetone, benzene, or kerosene, and the solutions of the chemicals emulsified in water with the aid of surface-active agents. Such surface-active agents are well known and reference is made to U.S. Pat. No. 2,547,724, columns 3 and 4, for detailed examples of the same. The chemicals of the invention may be admixed with powdered solid carriers, such as mineral silicates, together with a surface-active agent so that a wettable powder may be obtained which may be applied directly to plants, or which may be shaken up with water for application to the plants in that form.

The concentration of active chemical in the useful chemical pruning formulations may vary widely, e.g., from 1% to 95%. Generally, the active chemical in dispersions which are applied are from 0.05% to 6.0%. The amount per acre of active chemical applied may vary from 0.5 pound to 50 pounds depending on the plant being treated and other factors known to those skilled in the art.

Where the compounds are used as insecticides the concentration of active ingredient in the formulation ranges from 1 to 95%. Generally, the dispersion which is applied has from 0.0001 to 85% active chemical. The application rate is 0.1 to 25 lbs. per acre of active chemical.

For nematocide application, formulations generally contain 0.001 to 90% of active chemical and the dispersions which are applied have from 0.001 to 4.0%. Here the application rate ranges from 0.1 to 25 lbs./acre.

The following example illustrates the use of the compounds of the invention for killing meristematic buds.

EXAMPLE II

Rooted cuttings of *Chrysanthemum morifolium* cv. Improved Indianapolis Yellow are planted in 12 oz. styrofoam pots in a sterilized soil mixture of one part soil, one part peat moss, and one part horticultural perlite. At planting and weekly thereafter, the plants are fertilized with 25–5–30 analysis fertilizer at the rate of one ounce per three gallons of water. For seven to ten days following planting, the plants are placed under a polyethylene "tent" and frequently syringed to provide conditions of both high temperature and high relative humidity, respectively. The potted plants are maintained under long-day conditions by the use of supplemental fluorescent light from five p.m. to nine p.m. and from five a.m. to seven a.m. daily. Ten days to two weeks after planting the established plants are ready to treat.

Two and one-half grams of the selected compound and 0.23 gram of isooctyl phenyl polyethoxy ethanol are combined to produce an emulsifiable concentrate, 90% of which is the active ingredient. Enough water is added to the 2.83 grams of emulsifiable concentrate to bring the total volume to 100 ml. This results in a 25,000 p.p.m. solution. Dilutions to 10,000, 4,000 and 2,000 p.p.m. are prepared by diluting the appropriate amount of the 25,000 p.p.m. solution with water to which isooctyl phenyl polyethoxy ethanol has been added at the rate of two drops per 100 ml.

The aqueous formulations are applied as a foliar spray until the plants are wet to run-off. The plants are allowed to dry and then placed in the greenhouse at a temperature of 65° F. minimum night temperature.

With 12 to 24 hours following the application of optimum dosages and formulations of said compounds, the shoot apex, embryonic leaves and embryonic axillary meristems (hereinafter collectively referred to as the terminal meristem) turn black and are very flaccid. Within the next few days this same dead tissue turns grayish and a constriction appears on the stem at the proximal limit of the killed tissue. At optimum concentrations the compounds are non-phytotoxic to matured axillary meristems, leaves, and stem tissue. This process of killing the terminal meristem with aqueous emulsions of the compounds of the mentioned type is referred to as "chemical pruning."

At concentrations less than optimum the terminal meristem is not completely killed and therefore maintains apical dominance over the axillary meristems. At concentrations in excess of optimum both the terminal and axillary meristems may be killed without causing damage to foliage and stem tissue.

With other compounds, concentrations in excess of optimum may kill the terminal meristem and be phytotoxic to mature leaves but may not kill the axillary meristems. Concentrations in excess of optimum of still other compounds may kill the terminal and axillary meristems and be phytotoxic to the mature leaves.

Many compounds of the present invention selectively kill axillary meristems, whereas others selectively kill terminal and axillary meristems and yet remain non-phytotoxic to leaf and stem tissue. Compounds of this type may be useful for controlling sucker growth and disbudding.

Table II lists examples of alkyl ketoalkyl sulfites which show chemical pruning activity. The minimum chemical concentration of the compounds required to achieve chemical pruning and the phytotoxicity at this concentration are indicated.

TABLE II

| Compound | Minimum pruning dosages (p.p.m.) | Phytotoxicity rating |
| --- | --- | --- |
| 2-ketopropyl hexyl sulfite | 7,000 | Trace. |
| 2-ketopropyl n-octyl sulfite | 4,000 | Do. |
| 2-ketopropyl 2-octyl sulfite | 5,000 | Do. |
| 2-ketopropyl decyl sulfite | 5,000 | Do. |
| 4-ketopentyl octyl sulfite | 25,000 | Slight. |
| 2-methyl-3-ketobutyl octyl sulfite | ~20,000 | Moderate.* |
| 3-keto-2-butyl octyl sulfite | 9,000 | Trace.* |
| 3-ketobutyl octyl sulfite | ~20,000 | Slight.* |

*Axillary meristems killed.

The activity of the chemicals of the present invention as insecticides is shown against mosquito larvae and spider mites in the following example:

EXAMPLE III

In the mosquito larvae test, 10 mg. of chemical is dissolved in 1 ml. of acetone and diluted to 100 ml. with tap water to give a 100 p.p.m. solution. Dilution to 10 p.p.m. is made with tap water. Twenty five ml. aliquots of each dosage, replicated once, are placed in test tubes and ten 4th instar larvae of *Aedes aegypti* are added and the tubes are held at 70° F. in darkness for 72 hours. At the end of this period the live and dead are counted and percent control calculated.

In the mite contact test, 400 mg. of chemical is dissolved in 10 ml. of acetone and two drops of Triton X-100 [1]. This is then diluted to 200 ml. with distilled water to give a concentration of 2000 p.p.m. Four-week-old cotton seedlings, grown in 12 oz. styrofoam cups, are used as the host plants. A quarter sized circle of tanglefoot is placed on both primary leaves of each cotton plant in order to confine the mites to the upper leaf surface. Approximately 24 hours prior to spraying with said chemical, about ten two-spotted spider mites, *Tetranychus urticae*, are placed inside each circle. Plants are sprayed to run-off with the 2000 p.p.m. solution using a concentrate sprayer which is positioned 6" to 12" from the plants. One plant (two leaves) is used in each pot for one replicate. Two replicates are used for each chemical tested. Initial counts of the mites present are made shortly after spraying. The plants are held five days in the greenhouse, at which time a final count is made of the live adult mites remaining on the leaves. The percent control is calculated by using Abbotts formula:

Percent control $$= \frac{\text{Percent mites living (untreated)} - \text{(Percent mites living (treated)})}{\text{Percent mites living (untreated)}} \times 100$$

Table III shows the insecticidal activity of the alkyl ketoalkyl sulfites:

TABLE III

| Compound | Percent control of mosquito larvae | | Percent control of mites, 2,000 p.p.m. |
| --- | --- | --- | --- |
| | 100 p.p.m. | 10 p.p.m. | |
| 2-ketopropyl hexyl sulfite | 100 | 100 | |
| 2-ketopropyl octyl sulfite | 100 | 85 | |
| 2-ketopropyl decyl sulfite | 100 | 100 | |
| 4-ketopentyl octyl sulfite | 100 | 79 | 100 |
| 2-methyl-3-ketobutyl octyl sulfite | 100 | 87 | 100 |
| 3-keto-2-butyl octyl sulfite | 100 | 0 | 100 |
| 3-ketobutyl octyl sulfite | 100 | 65 | 95 |

[1] Isooctyl phenyl polyethoxy ethanol surface active wetting agents.

The nematocidal activity of the compounds of the invention is shown in the following example:

EXAMPLE IV

Three hundred milligrams chemical is dissolved in 10 ml. of acetone. Ninety milligrams (three drops from a standard medicine dropper) of this 3.0% solution is added to a BPI standard watch glass containing 150 mg. of a 0.01% solution of Triton X–100 (five drops) is distilled water. Thirty milligrams (1 drop) of a nematode suspension containing 50–100 live *Panagrellus redivivus* nematodes is added to the watch glass containing the chemical preparation. The final concentration of chemical in the BPI watch glass is 1.0% (10,000 p.p.m.). The test is conducted in duplicate using a dilution series. An untreated check, i.e., two watch glasses containing 0.01% Triton X–100 solution and nematodes but no chemical, is included in the test. The watch glasses are placed in 100 x 15 mm. inverted Petri plates and sealed with water to avoid evaporation. The test is kept in the laboratory at room temperature. The results are taken by microscopic inspection of the nematodes in the watch glasses. They are recorded as percent nematode control by contact after 48 hours.

Table IV shows the nematocidal activity of several alkyl ketoalkyl sulfites.

TABLE IV

| Compound | Percent control as a contact nematocide | |
|---|---|---|
| | 1,000 p.p.m. | 100 p.p.m. |
| 2-ketopropyl hexyl sulfite | 100 | 50 |
| 2-ketopropyl octyl sulfite | 100 | 100 |
| 2-ketopropyl decyl sulfite | 100 | 50 |
| 3-ketobutyl octyl sulfite | 90 | 0 |

Having thus described our invention, what we claim and desire to protect by Letters Patent is:

1. A compound having the formula:

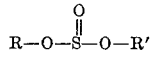

wherein R is an alkyl or a mono-haloalkyl radical having up to 10 carbon atoms and R' is a ketoalkyl group having 3 to 5 carbon atoms or a mono-halo-substituted derivative thereof.

2. The compound of claim 1: 2-ketopropyl hexyl sulfite.

3. The compound of claim 1: 2-ketopropyl n-octyl sulfite.

4. The compound of claim 1: 2-ketopropyl 2-octyl sulfite.

5. The compound of claim 1: 3-keto-2-butyl octyl sulfite.

References Cited

UNITED STATES PATENTS 2,819,211   1/1958   Mikeska et al. ____ 260—456X

LEON ZITVER, Primary Examiner

L. DE CRESCENTE, Assistant Examiner

U.S. Cl. X.R.

71—103; 424—303